United States Patent Office 3,010,987
Patented Nov. 28, 1961

3,010,987
PHOSPHORUS OZONE COMPOUNDS

Quentin E. Thompson, Belleville, Ill., assignor to Monsanto Chemical Company, St. Louis, Mo., a corporation of Delaware
No Drawing. Filed Dec. 24, 1959, Ser. No. 861,754
10 Claims. (Cl. 260—461)

This invention relates to a novel class of compounds formed by reacting a phosphite with ozone. More particularly, the invention is concerned with those compounds which are the reaction products of equimolar amounts of a triarylphosphite and ozone.

My copending application Serial No. 776,704, filed November 28, 1958, discloses the oxidation of trialkyl and triarylphosphites, phosphonites and phosphinites to the corresponding phosphates, phosphonates and phosphinates. The oxidizing agent employed is ozone, and the reaction proceeds according to either of the following equations which illustrate the production of typical phosphate:

(1) $2(CH_3O)_3P + O_3 \rightarrow 2(CH_3O)_3PO + \frac{1}{2}O_2$
(2) $3(C_6H_5O)_3P + O_3 \rightarrow 3(C_6H_5O)_3PO$ As seen in Equation 1, the use of a 2:1 molar ratio of phosphite to ozone yields two moles of the desired phosphate plus one half mole of oxygen. From Equation 2 it is apparent that by increasing said ratio to 3:1, three moles of the phosphate are obtained with no other product being formed.

According to the present invention it has been found that when triarylphosphites are reacted with ozone in a 1:1 molar ratio, a novel class of compounds is produced. Although these compounds are known to have the gross composition of adducts of ozone and triarylphosphites, their exact structure is not known. However, from their reactions, there is a strong presumption that the compounds of this invention have the following general structural formula

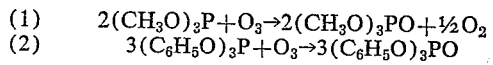

wherein R represents an aryl radical which is either unsubstituted or substituted by one or more groups which are inert with respect to ozone. Illustrative, but not limitative, of the radicals represened by R are phenyl, tolyl, ethylphenyl, n-propylphenyl, cumyl, n-butylphenyl, tert.-butylphenyl, sec. amylphenyl, 2-ethylhexy-phenyl, chlorophenyl, chlorotolyl, nitrophenyl, methoxyphenyl, ethoxyphenyl, xylyl, cymyl, dichlorophenyl, dibromophenyl, dinitrophenyl, diethoxyphenyl, trimethylphenyl, benzylphenyl, biphenyl, naphthyl and the like. From these exemplary radicals, it will be apparent that the aforesaid inert substituents comprise the halogens, alkyl radicals, alkoxy radicals and the nitro group, and that such substituents may vary from 1 to about 3 in number. It should be understood that the three aryl radicals attached to a starting phosphite compound may be like or unlike.

The novel compounds of this invention are prepared by reacting equimolar amounts of ozone and a triarylphosphite of the formula $P(OR)_3$ where R has the same meaning as above. The reactants are added simultaneously to a suitable vessel. The rate of ozone addition should be such as to maintain a slight excess of ozone in the mixture during the reaction. The triarylphosphite is added to the reaction vessel in a solvent solution. Of primary concern in the selection of the solvent is the requirement that said solvent be relatively inert with respect to ozone. Another factor to be taken into consideration is that the chosen solvent must remain liquid at the low reaction temperatures hereinafter specified.

The phosphorus ozone compounds of this invention have been found to be unstable at temperatures above about −10 to −15° C. Thus, of necessity, the reaction must be run at lower temperatures. The preferred range for conducting said reaction is from about −30 to −60° C. Among the aforesaid solvents which are usable in the preparation of these compounds are chloroform, methylene chloride, ethylene chloride, ethylene dichloride, chlorobenzene and the like. It should be noted that other inert solvents such as carbon tetrachloride, acetonitrile and the like may also be used. However, these latter solvents are preferably employed in admixture with one of the former group or with some other inert diluent capable of depressing the melting point to the desired range.

The ozone used in preparing the compounds of this invention is generally taken from a standardized ozone-oxygen stream. In the event that the oxygen vehicle is undesirable, said ozone may be suitably carried in another inert such as nitrogen, argon or the like.

The following illustrative examples will provide those skilled in the art with a better understanding of the invention. It is to be emphasized that there is no intention to limit this invention in any manner by the details recited in such examples since it will be apparent that many variations may be made without departing from the spirit and scope of the invention.

EXAMPLE I

A standardized ozone-oxygen stream delivering 0.70 millimoles of ozone per minute was directed into a reactor flask already charged with 100 ml. of anhydrous methylene chloride at −70° C. A solution (2 molar) of triphenylphosphite in methylene chloride was added dropwise from a buret. The rate of phosphite addition was maintained slightly slower (in millimoles per minute) than that of ozone. In this manner a slight excess of ozone was present in the methylene chloride solution.

In order to determine the amount of ozone consumed by the reaction, the reactor flask was provided with an off gas line leading to traps containing a potassium iodide solution. When 11.85 millimoles of triphenylphosphite had been added, the ozone addition was terminated. Any unreacted ozone was sparged out with nitrogen. The amount of ozone which escaped in the off gas was determined by titration of the iodine liberated in the potassium iodide containing trap. Said amount was found to be 4.0 millimoles. The total amount of ozone delivered was 15.9 millimoles whereby the ozone consumed by the reaction was equal to 11.9 millimoles. The reaction of such an amount with the 11.85 millimoles of phosphite clearly demonstrates the 1:1 molecular ratio of the phosphite ozone product.

EXAMPLE II

Following the procedure of the preceding example, tri-p-tolyl phosphite was substituted for the triphenylphosphite. It was found that 25 millimoles of this different phosphite reacted with 24.5 millimoles of ozone to form the desired adduct.

EXAMPLE III

Again employing the procedure described in Example I, a tri-(p-tert. butylphenyl) phosphite ozone compound was prepared. It was determined that 20.1 millimoles of ozone reacted with 20.9 millimoles of the phosphite starting material.

The compounds prepared above are typical of the compounds of this invention and find utility as low temperature oxodizing agents. They are particularly useful in this respect since they contain two active oxygen atoms per molecule. They are thus capable of oxidizing two moles of an oxidizable substance which requires one oxygen atom per mole. This utility can be employed to demonstrate the composition of the compounds of the invention. In Table I which follows, the triphenylphosphite ozone adduct was to oxidize various phosphorus and sulfur compounds.

Table I

| Compound to be oxidized | Millimoles of adduct | Oxidation product | Millimoles of product | Millimoles product/ Millimoles adduct |
|---|---|---|---|---|
| $(nC_4H_9O)_3P$ | 11.85 | $(nC_4H_9O)_3P=O$ | 21.0 | 1.78 |
| $(nC_4H_9)_3P$ | 17.3 | $(nC_4H_9)_3P=O$ | 29.3 | 1.69 |
| $(C_6H_5O)_3P$ | 12.4 | $(C_6H_5O)_3P=O$ | 24.5 | 1.97 |
| $CH_3SCH_3$ | 38.0 | $CH_3SOCH_3$ | 63.0 | 1.66 |
| $CH_3SOCH_3$ | 38.0 | $CH_3SO_2CH_3$ | 40.0 | 1.05 |

In each of the above oxidations it should be pointed out that the

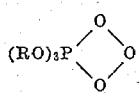

oxidizing agent yields 1 mole of $(RO)_3P=O$ where R has the same meaning as above in addition to the 2 moles of the oxidized product of the compound listed in the first column of Table I. The results of these tests, particularly as tabulated in the right hand column, show that the phosphite ozone adduct oxidizes approximately two moles of starting material per mole of adduct as expected. The substantially lower figure obtained in the oxidation of dimethyl sulfoxide is attributed to the fact that the starting material is already partially oxidized, and the addition of a second oxygen atom will not proceed as readily as at first.

In order to isolate the triphenylphosphite ozone adduct, preparation thereof was carried out using methyl chloride as a solvent. Since the latter has a boiling point of —24° C., it was possible to boil out most of said solvent at a temperature below the decomposition point of the adduct. A yellow oil remained after said boiling. The oil decomposed vigorously at about —10 to —15° C. to yield oxygen and triphenyl phosphate, M.P. 48–49° C., according to the equation (3)      $(C_6H_5O)_3P-O_3 \rightarrow (C_6H_5O)_3P=O+O_2$ The adducts of Examples II and III were also employed as oxidizing agents. It was found that 24.5 millimoles of the tri p-tolyl phosphite ozone compound oxidized 44 millimoles of tributyl phosphite in accordance with Equation 4

(4)
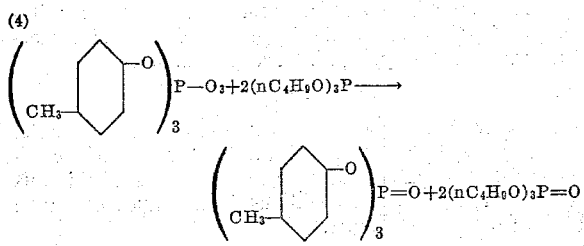

Based upon said equation, the tributyl phosphate obtained was equal to 90% of theory. Similarly the product of Example III oxidized 36 millimoles of tributyl phosphite in the following manner (5)
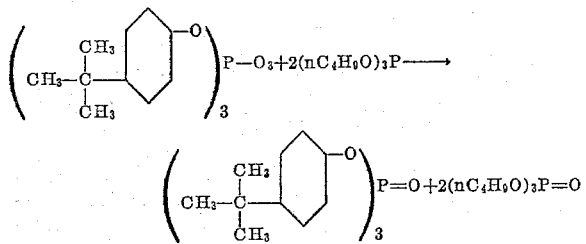

In this instance, the yield of tributyl phosphate was 89.5% of theory.

It should again be pointed out the exemplary compounds described herein are merely illustrative of the novel class of phosphite ozone adducts of this invention. It is obvious that various changes and modifications may be made by those skilled in the art without departing from the invention, particularly as defined in the appended claims.

This application is a continuation in part of my copending application Serial No. 776,704, filed November 28, 1958.

What is claimed is:

1. A phosphorus ozone compound comprising the reaction product of equimolar amounts of ozone and a triarylphosphite at a temperature below about —15° C.

2. A phosphorus ozone compound comprising the reaction product of equimolar amounts of ozone and a tri(alkylphenyl) phosphite at a temperature below about —15° C.

3. A phosphorus ozone compound comprising the reaction product of equimolar amounts of ozone and triphenylphosphite at a temperature below about —15° C.

4. A phosphorus ozone compound comprising the reaction product of equimolar amounts of ozone and tritolylphosphite at a temperature below about —15° C.

5. A phosphorus ozone compound comprising the reaction product of equimolar amounts of ozone and tri(butylphenyl) phosphite at a temperature below about —15° C.

6. A phosphorus ozone compound comprising the reaction product of equimolar amounts of ozone and tri(chlorophenyl) phosphite at a temperature below about —15° C.

7. A phosphorus ozone compound comprising the reaction product of equimolar amounts of ozone and tri(methoxyphenyl) phosphite at a temperature below about —15° C.

8. A process comprising the steps of reacting equimolar amounts of ozone and a triarylphosphite at a temperature below about —15° C.

9. A process comprising the steps of reacting equimolar amounts of ozone and a triarylphosphite at a temperature below about —15° C. in the presence of an inert solvent, said solvent being liquid at the reaction temperature.

10. A process comprising the steps of reacting equimolar amounts of ozone and a triarylphosphite at a temperature of about —30 to —60° C.

References Cited in the file of this patent

Richter: Textbook of Organic Chemistry, 1938 edition, pp. 94–95, John Wiley & Sons, New York, N.Y.